(12) United States Patent
Du

(10) Patent No.: US 11,412,489 B2
(45) Date of Patent: Aug. 9, 2022

(54) UPLINK CONTROL INFORMATION TRANSMISSION METHOD AND DEVICE

(71) Applicant: CHINA ACADEMY OF INFORMATION AND COMMUNICATIONS, Beijing (CN)

(72) Inventor: Ying Du, Beijing (CN)

(73) Assignee: CHINA ACADEMY OF INFORMATION AND COMMUNICATIONS, Beijing (CN)

( * ) Notice: Subject to any disclaimer, the term of this patent is extended or adjusted under 35 U.S.C. 154(b) by 155 days.

(21) Appl. No.: 16/926,856

(22) Filed: Jul. 13, 2020

(65) Prior Publication Data

US 2020/0359372 A1 Nov. 12, 2020

Related U.S. Application Data

(63) Continuation of application No. PCT/CN2019/071422, filed on Jan. 11, 2019.

(30) Foreign Application Priority Data

Jan. 12, 2018 (CN) .......................... 201810031117.4

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1812* (2013.01); *H04L 1/1819* (2013.01); *H04L 5/0055* (2013.01); *H04W 72/1268* (2013.01)

(58) Field of Classification Search
CPC .......... H04W 72/0413; H04W 72/1268; H04L 1/1812; H04L 1/1819; H04L 5/0055
See application file for complete search history.

(56) References Cited

U.S. PATENT DOCUMENTS 9,584,300 B2 * 2/2017 Yang .................... H04W 52/367
10,834,681 B2 * 11/2020 Hwang ............... H04W 52/281
(Continued)

FOREIGN PATENT DOCUMENTS

| CN | 105191441 A | 12/2015 |
|----|-------------|---------|
| CN | 105409153 A | 3/2016 |

(Continued)

OTHER PUBLICATIONS

3GPP TSG RAN WG1 Meeting 91, R1-1721693, "WF on remaining aspects on SUL operations", Huawei, HiSilicon, CMCC, Ericsson, Intel, (Dec. 4, 2017).
(Continued)

*Primary Examiner* — Michael J Moore, Jr.
(74) *Attorney, Agent, or Firm* — NZ Carr Law Office

(57) ABSTRACT

The present application discloses an uplink control information transmission method and device. The method includes: determining, by user equipment, a physical uplink control channel (PUCCH) corresponding to uplink control information (UCI); and transmitting, by the user equipment, the UCI on a first PUSCH in a first physical uplink shared channel (PUSCH) set; wherein every PUSCH contained in the first PUSCH set overlaps with the PUCCH in time. In this way, the challenge to the processing capability of the user equipment caused by transmitting the uplink control information on the PUSCHs can be effectively avoided, and meanwhile, the downlink data transmission performance can be ensured.

16 Claims, 4 Drawing Sheets

```
                            ┌─ 201
Determining, by user equipment, a physical uplink control channel (PUCCH) corresponding to
                        uplink control information (UCI)

┌─ 202
Transmitting, by the user equipment, the UCI on a first PUSCH in a first physical uplink shared
                              channel (PUSCH) set
```

(51) Int. Cl.
*H04L 5/00* (2006.01)
*H04W 72/12* (2009.01)

(56) References Cited

U.S. PATENT DOCUMENTS

| | | |
|---|---|---|
| 2016/0262182 A1 | 9/2016 | Yang et al. |
| 2019/0132104 A1* | 5/2019 | Lee .................. H04L 1/1896 |
| 2019/0215781 A1* | 7/2019 | Jeon .................. H04W 24/10 |
| 2019/0223201 A1* | 7/2019 | Lee ................. H04W 72/0413 |
| 2020/0045722 A1* | 2/2020 | Bae .................. H04L 5/0044 |
| 2020/0288459 A1* | 9/2020 | Du ................. H04W 72/0413 |

FOREIGN PATENT DOCUMENTS

| | | |
|---|---|---|
| CN | 105850057 A | 8/2016 |
| CN | 107210794 A | 9/2017 |
| CN | 107409025 A | 11/2017 |
| EP | 2129149 A | 12/2009 |
| WO | 2018028139 A1 | 2/2018 |

OTHER PUBLICATIONS

3GPP TSG RAN WGI Meeting 90, R1-1713945, "UCI on PUSCH", NTT DOCOMO, Inc. (Aug. 12, 2017).

\* cited by examiner

UPLINK CONTROL INFORMATION TRANSMISSION METHOD AND DEVICE

This application is a continuation of International Application No. PCT/CN2019/071422, having an international filing date of Jan. 11, 2019, entitled "UPLINK CONTROL INFORMATION TRANSMISSION METHOD AND DEVICE". The present application also claims priority to Chinese Patent Application No. 201810031117.4, filed to the Patent Office of the People's Republic of China on Jan. 12, 2018 and entitled *Uplink Control Information Transmission Method and Device*, of which the entire contents are incorporated herein by reference.

FIELD

The present application relates to the technical field of wireless communication, in particular to an uplink control information transmission method and device.

BACKGROUND

In a long term evolution (LTE) system, user equipment reports uplink control information (UCI) to base station equipment. The UCI is used as a basis for the base station equipment to schedule downlink data or uplink data transmission of terminal equipment. For example, the base station equipment transmits downlink service data through a physical downlink shared channel (PDSCH); and after receiving the downlink service data, the user equipment feeds back ACK or NACK information of the user equipment to the downlink service data on a physical uplink control channel (PUCCH) or physical uplink shared channels (PUSCH), so that the base station equipment determines whether to reschedule the downlink service data or schedule new downlink service data to the user equipment.

In practical application, considering the power consumption of the user equipment, it is generally not allowed to transmit the PUCCH and PUSCHs simultaneously. Then, the user equipment transmits the UCI which should be transmitted on the PUCCH on the PUSCHs overlapping with the PUCCH in time.

However, in a new generation of communication system (for example, a 5G communication system), PUSCH and PUCCH are more flexible in time, that is, the number of PUSCHs that overlap with PUCCH in time is also relatively large. Correspondingly, selecting which PUSCH from the multiple PUSCHs to transmit UCI requires different processing capabilities of the user equipment. Once the selected PUSCH is improper, either higher requirements are set on the processing capacity of the user equipment; or the problem of delay of downlink data transmission is caused.

In summary, there is an urgent need for an uplink control information transmission method to solve the problem of how to determine the PUSCH for transmitting the UCI from the multiple PUSCHs overlapping with the PUCCH in time.

SUMMARY

In view of this, embodiments of the present application provide an uplink control information transmission method and device for solving the problem of how to determine a PUSCH for transmitting UCI from multiple PUSCHs overlapping with a PUCCH in time.

An embodiment of the present application provides an uplink control information transmission method, including:

determining, by user equipment, a physical uplink control channel (PUCCH) corresponding to uplink control information (UCI); and transmitting, by the user equipment, the UCI on a first PUSCH in a first physical uplink shared channel (PUSCH) set;

wherein every PUSCH contained in the first PUSCH set overlaps with the PUCCH in time.

An embodiment of the present application provides an uplink control information transmission method, including:

scheduling, by base station equipment, a first physical uplink shared channel (PUSCH) set, wherein every PUSCH contained in the first PUSCH set overlaps with a physical uplink control channel (PUCCH) in time; and obtaining, by the base station equipment, uplink control information (UCI) transmitted by user equipment on a first PUSCH in the first PUSCH set.

An embodiment of the present application further provides uplink control information transmission device, including:

a processing unit, configured to determine a physical uplink control channel (PUCCH) corresponding to uplink control information (UCI); and a transmitting unit, configured to transmit the UCI on a first PUSCH in a first physical uplink shared channel (PUSCH) set;

wherein every PUSCH contained in the first PUSCH set overlaps with the PUCCH in time.

An embodiment of the present application also provides uplink control information transmission device, including:

a scheduling unit, configured to schedule a first physical uplink shared channel (PUSCH) set, wherein every PUSCH contained in the first PUSCH set overlaps with a physical uplink control channel (PUCCH) in time; and a processing unit, configured to obtain uplink control information (UCI) transmitted by user equipment on a first PUSCH in the first PUSCH set.

An embodiment of the present application further provides uplink control information transmission device, including at least one processor and a memory storing a program, and configured to perform the following steps by the at least one processor:

determining a physical uplink control channel (PUCCH) corresponding to uplink control information (UCI); and transmitting the UCI on a first PUSCH in a first physical uplink shared channel (PUSCH) set;

wherein every PUSCH contained in the first PUSCH set overlaps with the PUCCH in time.

An embodiment of the present application further provides uplink control information transmission device, including at least one processor and a memory storing a program, and configured to perform the following steps by the at least one processor:

scheduling a first physical uplink shared channel (PUSCH) set, wherein every PUSCH contained in the first PUSCH set overlaps with a physical uplink control channel (PUCCH) in time; and obtaining uplink control information (UCI) transmitted by user equipment on a first PUSCH in the first PUSCH set.

At least one embodiment provided by the present application has the following beneficial effects:

in the embodiments of the present application, the user equipment determines the physical uplink control channel (PUCCH) corresponding to the uplink control information (UCI); and the user equipment transmits the UCI on the first PUSCH in the first physical uplink shared channel (PUSCH) set; wherein every PUSCH contained in the first PUSCH set overlaps with the PUCCH in time. In this way, the challenge to the processing capability of the user equipment caused by transmitting the uplink control information on the PUSCHs can be effectively avoided, and meanwhile, the downlink data transmission performance can be ensured.

BRIEF DESCRIPTION OF THE DRAWINGS

In order to explain the technical solutions in the embodiments of the present application more clearly, the accompanying drawings required in the description of the embodiments are briefly introduced below. Obviously, the accompanying drawings in the following description are only some embodiments of the present application. Those of ordinary skill in the art can obtain other accompanying drawings based on these accompanying drawings without creative labor.

DETAILED DESCRIPTION OF THE EMBODIMENTS

Figure 1:
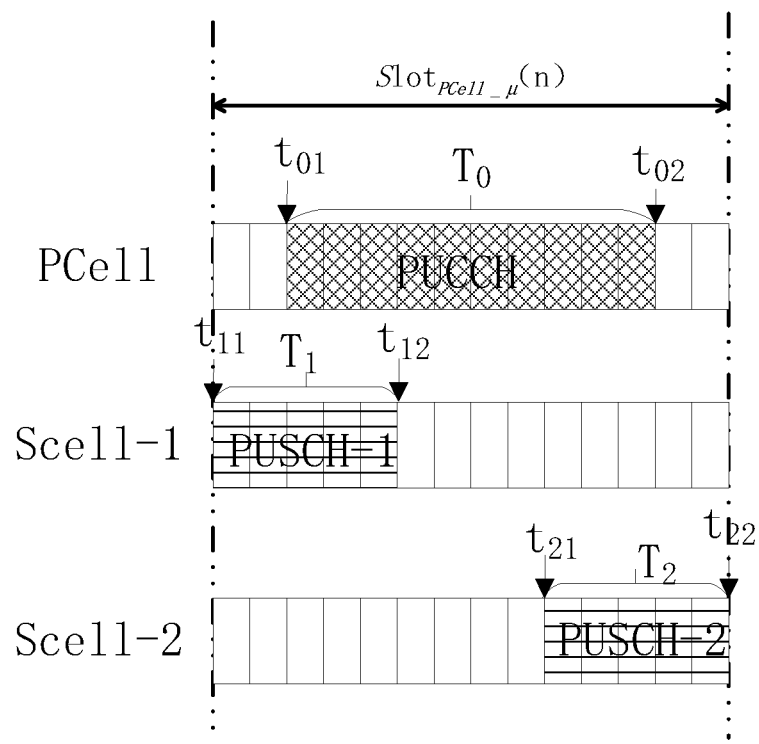
FIG. 1 is a schematic diagram of uplink control information transmission between base station equipment and user equipment in the prior art.

FIG. 1 is a schematic diagram of uplink control information transmission between base station equipment and user equipment in the prior art.

It can be seen from FIG. 1 that resources occupied by the user equipment on a PUCCH of PCell are the 3rd to 12th symbols in the time slot $Slot_{PCell\_\mu}(n)$.

If UCI transmitted by the user equipment includes HARQ-ACK, the base station equipment instructs the user equipment to transmit HARQ-ACK information on the PUCCH according to the processing capability of the user equipment, and thus the effects that the user equipment completes PDSCH reception and demodulation, obtains HARQ-ACK and finishes the processing procedure before transmitting HARQ-ACK at time $t_{01}$ can be ensured; and the effect that the delay of the HARQ-ACK transmission meets the transmission delay requirement of downlink data can be ensured by completing transmitting of the PUCCH by the user equipment at time $t_{02}$. If the UCI transmitted by the user equipment includes channel state information, the feedback period of the channel state information from terminal equipment can also ensure that the user equipment is ready for the processing procedures such as coding and modulation before the channel state information is transmitted at time $t_{01}$.

However, if within the PUCCH time range, the user equipment is configured or scheduled to transmit PUSCH-1 on SCell-1 and PUSCH-2 on SCell-2 respectively, wherein the PUSCH-1 occupies the 1st to 5th symbols, and the PUSCH-2 occupies the 10th to 14th symbols, if the user equipment transmits the HARQ-ACK which should be transmitted on the PUCCH on the PUSCH-1, the user equipment is required to complete the PDSCH reception and demodulation, obtain the HARQ-ACK and complete the processing procedure before the HARQ-ACK is transmitted at the start time $t_{11}$ of the PUSCH-1, and therefore higher requirements are placed on the processing speed and capability of user equipment. Or, if the UCI includes the channel state information, higher requirements are placed on the user equipment capability to measure a downlink channel state and pre-process the to-be-transmitted channel state information when the user equipment transmits the channel state information which should be transmitted on the PUCCH on the PUSCH-1; and if the user equipment transmits the HARQ-ACK which should be transmitted on the PUCCH on the PUSCH-2, the user equipment can complete the HARQ-ACK transmission only at the end time $t_{12}$ of the PUSCH-2. Compared with the mode that the HARQ-ACK is transmitted on the PUCCH, the delay in acquiring the HARQ-ACK by the base station equipment may affect the delay performance of downlink data transmission. Similarly, if the UCI includes channel state information, the user equipment transmits the channel state information which should be transmitted on the PUCCH on the PUSCH-2, then obtaining of the downlink channel state by the base station equipment is delayed, and consequently the data scheduling time of the base station for the user equipment is affected.

In order to make the purposes, technical solutions and advantages of the present application clearer, the embodiments of the present application provide an uplink control information transmission method and device. User equipment determines a physical uplink control channel (PUCCH) corresponding to uplink control information (UCI), selects one PUSCH meeting the condition from at least one PUSCH overlapping with the PUCCH in time, and transmits the uplink control information (UCI) to base station equipment on the selected PUSCH, wherein the UCI includes ACK/NACK of the user equipment for downlink data and/or channel state information. The condition herein can be determined according to a threshold of the Time Difference, supported by the user equipment, between the reception time of the PDSCH and the transmission time of the ACK/NACK corresponding to the downlink data, or according to the end time of the at least one PUSCH and the PUCCH, thus, the challenge to the processing capability of the user equipment caused by transmitting the uplink control information on the PUSCHs can be effectively avoided, and meanwhile, the downlink data transmission performance can be ensured.

The present application is described in further detail below in conjunction with the accompanying drawings of the specification. Obviously, the described embodiments are only a part of the embodiments of the present application, but not all the embodiments. Based on the embodiments in the present application, all other embodiments obtained by those of ordinary skill in the art without creative efforts fall within the protection scope of the present application.

Figure 2:
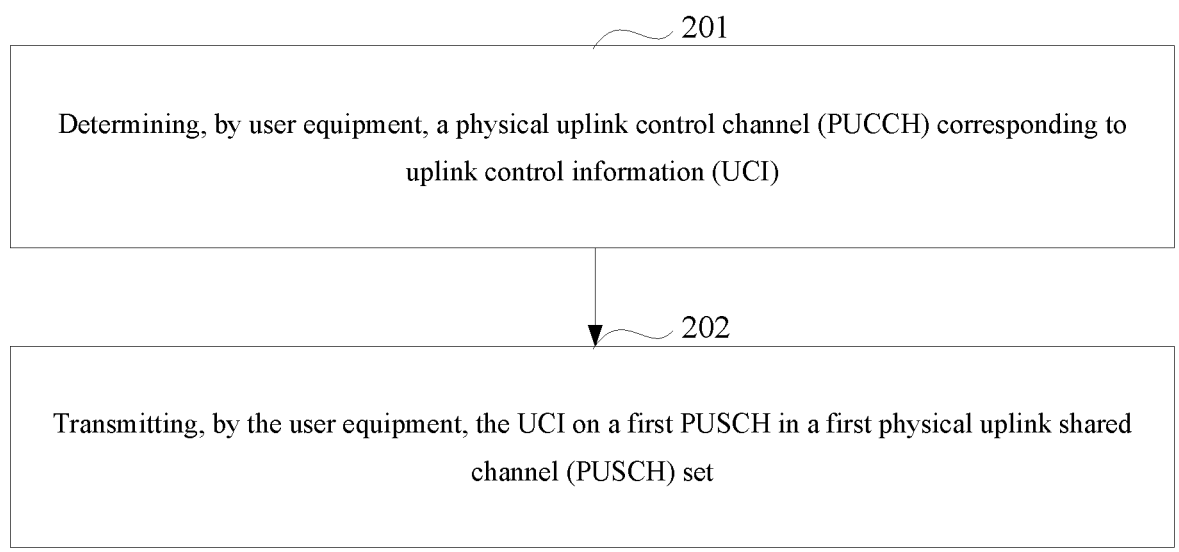
FIG. 2 is a schematic flowchart of an uplink control information transmission method according to embodiments of the present application.

FIG. 2 is a schematic flowchart of an uplink control information transmission method according to an embodiment of the present application. The method may include the following steps.

Step 201: determining, by user equipment, a physical uplink control channel (PUCCH) corresponding to uplink control information (UCI).

In the embodiment of the present application, the user equipment determines the PUCCH corresponding to the UCI according to configuration information or scheduling information, and the determination mode is not specifically limited herein.

Step 202: transmitting, by the user equipment, the UCI on a first PUSCH in a first physical uplink shared channel (PUSCH) set.

Wherein every PUSCH contained in the first PUSCH set overlaps with the PUCCH in time.

It should be noted that the UCI includes hybrid automatic repeat request mechanism response information (HARQ-ACK/NACK), and the HARQ-ACK/NACK corresponds to at least one piece of downlink data received by the user equipment, and/or the UCI includes channel state information.

In the embodiment of the present application, when the user equipment determines the PUCCH corresponding to the UCI, since the PUCCH and the PUSCHs cannot be transmitted simultaneously, the user equipment may quit transmitting the PUCCH and then transmits the UCI through the PUSCHs. The case that the user equipment cannot transmit the PUCCH and the PUSCHs simultaneously can be caused by incapability of the user equipment, or be indicated, by network equipment, that the user equipment is not allowed to transmit the PUSCHs and the PUCCH simultaneously through configuration information.

The user equipment determines the PUSCHs overlapping with the PUCCH in time according to the time of the determined PUCCH, wherein there can be one PUSCH or multiple PUSCHs herein. If there are multiple PUSCHs, the PUSCHs can be called as the first PUSCH set.

Then the user equipment transmits the UCI on the first PUSCH in the first PUSCH set.

Not any PUSCH contained in the first PUSCH set can be used as the first PUSCH, but certain conditions must be met to ensure that the user equipment is prepared with to-be-transmitted uplink control information before transmitting the first PUSCH, such as: HARQ-ACK/NACK and/or CSI.

Further, the first PUSCH belongs to a second PUSCH set, and the second PUSCH set is composed of PUSCHs, meeting the set condition, in the first PUSCH set.

The set condition in the embodiment of the present application may include one of the following cases or any combination:

1. The set condition includes that: the Time Difference between the start time of the PUSCH and the end time of the at least one piece of downlink data is not less than a first set threshold.

Wherein the first set threshold corresponds to the minimum value of the Time Differences supported by the user equipment, and the Time Difference is the time difference between the end time of a physical downlink shared channel (PDSCH) and the start time of corresponding HARQ-ACK/NACK feedback.

Since the user equipment needs to complete processing such as demodulation of the downlink data, determination of the HARQ-ACK/NACK information and encoding, adjusting and mapping of the HARQ-ACK/NACK information before transmitting the first PUSCH, and the processing is related to the processing capability of terminal equipment, the first set threshold is usually selected from the minimum value or the critical value of the time differences, supported by the user equipment, between the end time of the physical downlink shared channel (PDSCH) and the start time of corresponding HARQ-ACK/NACK feedback.

Although the PUSCHs contained in the first PUSCH set overlap with the PUCCH in time, not all PUSCHs meet the set condition. Furthermore, the PUSCHs adopted by the user equipment to transmit the UCI also need to meet the set condition. The "set condition" herein can be that the Time Difference between the start time of the PUSCHs and the end time of the downlink data is not less than the first set threshold. Then, the PUSCHs meeting the set condition herein can be called as a second PUSCH set.

2. The set condition described in the embodiment of the present application includes that the start time of the PUSCH is not earlier than the start time of the PUCCH.

Preferably, in the embodiment of the present application, in order to ensure that the base station equipment receives the uplink control information after the start time of the PUCCH, the start time of the first PUSCH adopted by the user equipment is not earlier than the start time of the PUCCH. The user equipment transmits the UCI on the first PUSCH not earlier than the PUCCH in start time, and new requirements can be prevented from being placed on the processing capability of the user equipment.

3. The set condition described in the embodiment of the present application includes that the end time of the PUSCH is not later than the end time of the PUCCH.

Preferably, in the embodiment of the present application, it is considered that if the end time of the first PUSCH is later than the end time of the PUCCH, the uplink control information received by the base station equipment will be delayed, and then the problem of downlink data transmission delay will occur. Therefore, the end time of the first PUSCH adopted by the user equipment is not later than the end time of the PUCCH.

It should be noted that the above-mentioned listed set condition can be used in combination or individually, which is not specifically limited herein.

Optionally, for the PUSCHs contained in the second PUSCH set, if at least two PUSCHs in the second PUSCH set which meets the set condition, then the set condition described in the embodiment of the present application includes that: the start time of the first PUSCH is the earliest among the start time of every PUSCH in the second PUSCH set and/or the index of the cell where the first PUSCH is located is the smallest among cells where every PUSCH in the second PUSCH set is located.

That is, at least two PUSCHs meet the set condition in a first PUSCH set; the start time of the first PUSCH is the earliest among the start time of every PUSCH meeting the set condition and/or an index of the cell where the first PUSCH is located is the smallest among cells where every PUSCH meeting the set condition is located.

Specifically, one first PUSCH is adopted by the user equipment, assuming that the number of the PUSCHs meeting the set condition obtained after the above condition judgment is greater than 1, then it is necessary to ensure that the start time of the first PUSCH is the earliest in the second PUSCH set; or the index of the cell where the first PUSCH is located is the smallest among the cells where every PUSCH in the second PUSCH set is located; or the start time of the first PUSCH is the earliest in the second PUSCH set and the index of the cell where the first PUSCH is located is the smallest among the cells where every PUSCH in the second PUSCH set is located.

Through the technical solutions provided by the embodiment of the present application, the user equipment determines the physical uplink control channel (PUCCH) corresponding to the uplink control information (UCI); and the user equipment transmits the UCI on the first PUSCH in the physical uplink shared channel (PUSCH) set; wherein every PUSCH contained in the PUSCH set overlaps with the PUCCH in time. In this way, the challenge to the processing capability of the user equipment caused by transmitting the uplink control information on the PUSCHs can be effectively avoided, and meanwhile, the downlink data transmission performance can be ensured.

Figure 3:
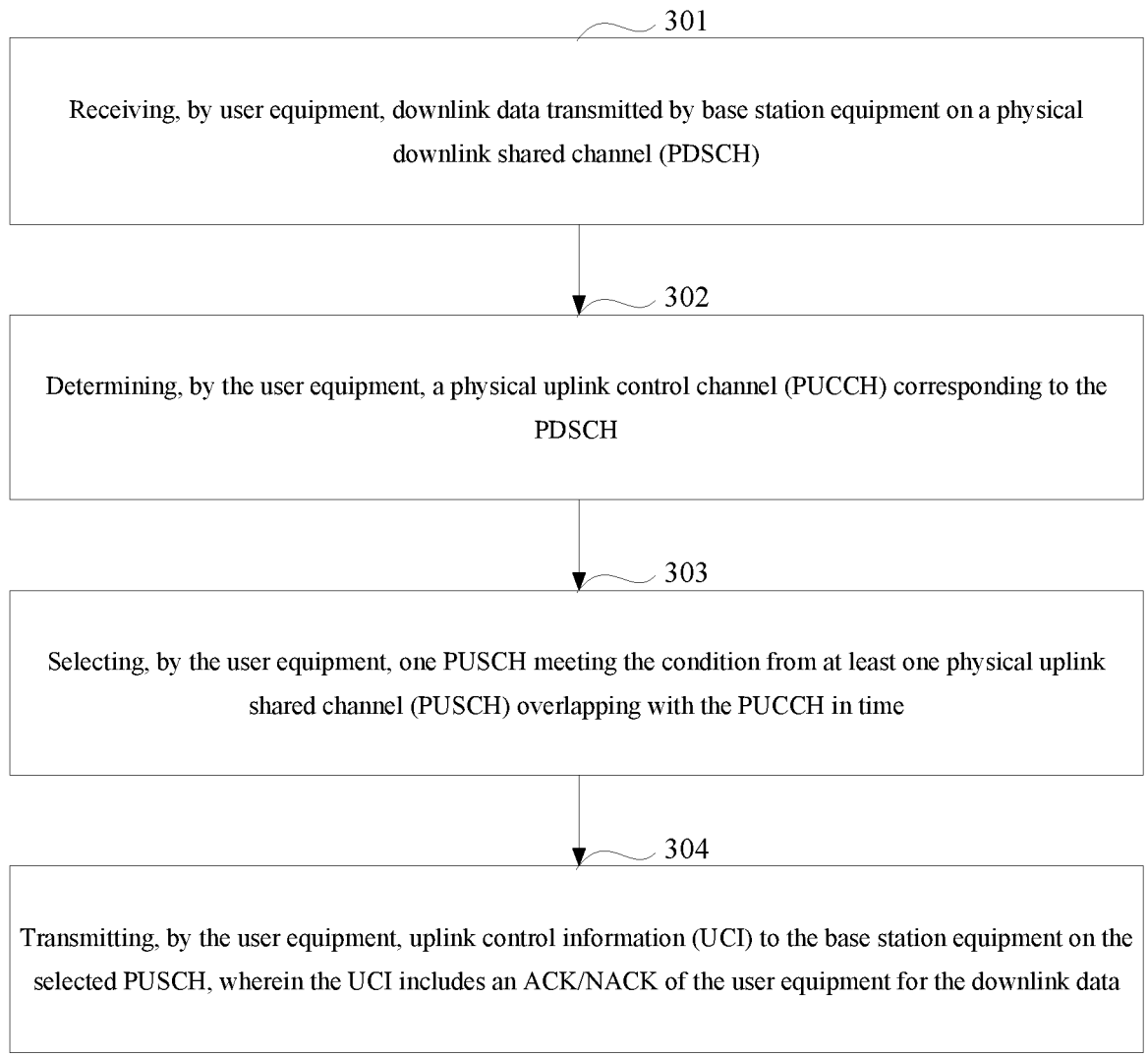
FIG. 3 is a schematic flowchart of an uplink control information transmission method according to embodiments of the present application.

Based on the same inventive concept, FIG. 3 is a schematic flowchart of an uplink control information transmission method according to an embodiment of the present application. The method may include the following steps.

Step 301: receiving, by user equipment, downlink data transmitted by base station equipment on a physical downlink shared channel (PDSCH).

In the embodiment of the present application, the base station equipment may schedule the downlink data transmitted to the user equipment through physical downlink control information. One or more downlink data can be received by the user equipment herein, that is, the PDSCHs described herein can be a PDSCH set, and the PDSCH set includes at least one PDSCH.

Step 302: determining, by the user equipment, a physical uplink control channel (PUCCH) corresponding to the PDSCHs.

In the embodiment of the present application, the physical uplink control channel (PUCCH) corresponding to the PDSCHs can be understood as the PUCCH corresponding to the PDSCH set. The "correspondence" relationship establishment herein can be determined according to the indication of the physical downlink control information, or can be determined according to a preset fixed Time Difference, and the specific implementation mode is not specifically limited herein.

Preferably, after determining the PUCCH, the user equipment may determine at least one PUSCH overlapping with the PUCCH in time according to time to obtain the PUSCH set. The PUSCHs contained in the PUSCH set can be located in one cell or in different cells, which is not specifically limited herein.

Step 303: selecting, by the user equipment, one PUSCH meeting the condition from the at least one physical uplink shared channel (PUSCH) overlapping with the PUCCH in time.

In the embodiment of the present application, the user equipment selects the PUSCH meeting the requirement on the time difference between the reception time of a PDSCH and the transmission time of ACK/NACK corresponding to the downlink data from the at least one physical uplink shared channel (PUSCH) overlapping with the PUCCH in time.

Specifically, the user equipment determines the reception time of receiving the PDSCH and the transmission time of the ACK/NACK corresponding to the downlink data; and the user equipment selects one PUSCH from the at least one physical uplink shared channel (PUSCH) overlapping with the PUCCH in time, wherein the PUSCH meets the requirement on the time difference between the reception time of a PDSCH and the transmission time of ACK/NACK corresponding to the downlink data.

If at least two pieces of downlink data are received by the user equipment, the step of selecting, by the user equipment, one PUSCH meeting the condition from the at least one physical uplink shared channel (PUSCH) overlapping with the PUCCH in time includes:

firstly, determining, by the user equipment, the reception time of receiving the PDSCHs, and performing the following operation for each piece of downlink data:

determining, by the user equipment, the first transmission time of the ACK/NACK corresponding to the downlink data, and computing the time difference between the reception time and the first transmission time corresponding to the downlink data according to the reception time; and secondly, determining, by the user equipment, the end time of the PDSCH corresponding to each piece of downlink data, and performing the following operations for each PUSCH:

computing, by the user equipment, the time difference between the start time of the PUSCH and the end time of the PDSCH corresponding to all downlink data to obtain multiple time differences; and selecting, by the user equipment, a PUSCH of which the corresponding time differences are all not less than a first set threshold from the at least one physical uplink shared channel (PUSCH) overlapping with the PUCCH in time after the multiple time differences corresponding to all PUSCHs are obtained;

wherein the first set threshold corresponds to the minimum value of the Time Differences supported by the user equipment, and the Time Difference is the time difference between the end time of the physical downlink shared channel (PDSCH) and the start time of corresponding HARQ-ACK/NACK feedback.

Preferably, the method further includes:

determining, by the user equipment, the Start Time of every selected PUSCH if multiple PUSCHs of which the corresponding Time Differences are all not less than the first set threshold are selected; and selecting according to the Start Time, by the user equipment, the PUSCHs of which the Start Time is not earlier than the start time of the PUCCH.

Preferably, the method further includes:

determining, by the user equipment, the End Time of every selected PUSCH if multiple PUSCHs of which the corresponding Time Differences are all not less than the first set threshold are selected; and selecting according to the End Time, by the user equipment, the PUSCHs of which the End Time is not later than the end time of the PUCCH.

In this way, assuming that the multiple PUSCHs are selected, the user equipment selects the PUSCH with the earliest start time and/or the smallest index among the cells where the PUSCHs are located.

Step 304: transmitting, by the user equipment, uplink control information (UCI) to the base station equipment on the selected PUSCH, wherein the UCI includes an ACK/NACK of the user equipment for the downlink data.

It should be noted that the UCI described in the embodiment of the present application may also include CSI (channel state information), RI (rank indication) and other information in addition to the ACK/NACK of the user equipment for the downlink data.

Figure 4:
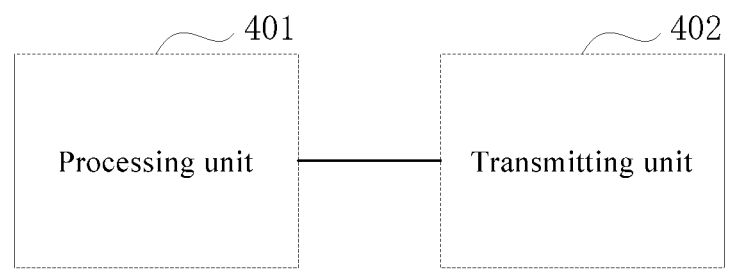
FIG. 4 is a structural schematic diagram of uplink control information transmission device according to embodiments of the present application.

FIG. 4 is a structural schematic diagram of uplink control information transmission device according to an embodiment of the present application. The device includes a processing unit 401 and a transmitting unit 402, wherein:

the processing unit 401 is configured to determine a physical uplink control channel (PUCCH) corresponding to uplink control information (UCI);

the transmitting unit 402 is configured to transmit the UCI on a first PUSCH in a physical uplink shared channel (PUSCH) set;

wherein every PUSCH contained in the PUSCH set overlaps with the PUCCH in time.

In another embodiment of the present application, the UCI includes hybrid automatic repeat request mechanism response information (HARQ-ACK/NACK), and the HARQ-ACK/NACK corresponds to at least one piece of downlink data received by the user equipment.

In another embodiment of the present application, the first PUSCH belongs to a second PUSCH set, and the second PUSCH set is composed of PUSCHs, meeting the set condition, in the first PUSCH set.

In another embodiment of the present application, the set condition includes that the Time Difference between the Start Time of the PUSCH and the End Time of the at least one piece of downlink data is not less than a first set threshold;

wherein the first set threshold corresponds to the minimum value of the Time Differences supported by the user equipment, and the Time Difference is the time difference between the End Time of a physical downlink shared channel (PDSCH) and the Start Time of corresponding HARQ-ACK/NACK feedback.

In another embodiment of the present application, the set condition includes that: the Start Time of the PUSCH is not earlier than the start time of the PUCCH.

In another embodiment of the present application, the set condition includes that: the end time of the PUSCH is not later than the end time of the PUCCH.

In another embodiment of the present application, if the second PUSCH set includes at least two PUSCHs, the start time of the first PUSCH is the earliest among the start time of all PUSCHs in the second PUSCH set and/or the index of the cell where the first PUSCH is located is the smallest among cells where every PUSCH in the second PUSCH set is located.

It should be noted that the uplink control information transmission device provided by the embodiments of the present application can be implemented by software or hardware, which is not specifically limited herein. Through the uplink control information transmission device, the challenge to the processing capability of the user equipment caused by transmitting the uplink control information on the PUSCHs can be effectively avoided, and meanwhile, the downlink data transmission performance can be ensured.

Based on the same inventive concept, an embodiment of the present application further provides uplink control information transmission device, including at least one processor and a memory storing a program, and configured to perform the following steps by the at least one processor:

determining a physical uplink control channel (PUCCH) corresponding to uplink control information (UCI);

transmitting the UCI on a first PUSCH in a first physical uplink shared channel (PUSCH) set;

wherein every PUSCH contained in the first PUSCH set overlaps with the PUCCH in time.

It should be noted that the processors in the uplink control information transmission device described in the embodiment of the present application can be central processors or other types of control device, which is not specifically limited herein.

Based on the same inventive concept, an embodiment of the present application further provides uplink control information transmission device. The device includes: a receiving unit, a processing unit and a transmitting unit, wherein:

the receiving unit is configured to receive downlink data transmitted by base station equipment on the physical downlink shared channel (PDSCH);

the processing unit is configured to determine a physical uplink control channel (PUCCH) corresponding to the PDSCHs, and select one PUSCH meeting the condition from at least one physical uplink shared channel (PUSCH) overlapping with the PUCCH in time; and the transmitting unit is configured to transmit uplink control information (UCI) to the base station equipment on the selected PUSCH, wherein the UCI includes an ACK/NACK of user equipment for the downlink data.

In another embodiment of the present application, if one piece of downlink data is received, the step of selecting, by the processing unit, one PUSCH meeting the condition from the at least one physical uplink shared channel (PUSCH) overlapping with the PUCCH in time includes:

determining the reception time of receiving the PDSCHs and the transmission time of the ACK/NACK corresponding to the downlink data;

selecting one PUSCH from the at least one physical uplink shared channel (PUSCH) overlapping with the PUCCH in time, wherein the PUSCH meets the requirement on the time differences between the reception time of the PDSCHs and the transmission time of the ACK/NACK corresponding to the downlink data.

In another embodiment of the present application, if at least two pieces of downlink data are received, the uplink control information transmission device further includes: a computing unit, wherein:

the computing unit is configured to determine the reception time of receiving PDSCHs; and perform the following operation for each piece of downlink data:

determining, by user equipment, the first transmission time of ACK/NACK corresponding to the downlink data, and computing the time difference between the reception time and the first transmission time corresponding to the downlink data according to the reception time.

In another embodiment of the present application, the step of selecting, by the processing unit, one PUSCH meeting the condition from at least one physical uplink shared channel (PUSCH) overlapping with the PUCCH in time includes:

determining the end time of the PDSCH corresponding to each piece of downlink data; and performing the following operations for each PUSCH: computing the Time Difference between the start time of the PUSCH and the end time of the PDSCHs corresponding to all downlink data to obtain multiple time differences;

selecting PUSCHs of which the corresponding time differences are all not less than a first set threshold from the at least one physical uplink shared channel (PUSCH) overlapping with the PUCCH in time after the multiple time differences corresponding to all PUSCHs are obtained;

wherein the first set threshold is determined according to differences between the end time of the PUSCHs received by user equipment and the start time of the ACK/NACK, fed back from the user equipment, corresponding to the downlink data.

In another embodiment of the present application, if multiple PUSCHs of which the corresponding time differences are all not less than a first set threshold are selected, the processing unit is further configured to determine the Start Time of every selected PUSCH; and according to the Start Time, select the PUSCH of which the Start Time is not earlier than the start time of the PUCCH.

In another embodiment of the present application, if multiple PUSCHs of which the corresponding Time Differences are all not less than a first set threshold are selected, the processing unit is further configured to determine the End Time of every selected PUSCH; and according to the End Time, select the PUSCH of which the End Time is not later than the end time of the PUCCH.

In another embodiment of the present application, if multiple PUSCHs are selected, the processing unit is further configured to select the PUSCH with the earliest start time and/or the smallest index among cells where the PUSCHs are located.

It should be noted that the uplink control information transmission device provided by the embodiments of the present application can be implemented by software or hardware, which is not specifically limited herein. Through the uplink control information transmission device, the challenge to the processing capability of the user equipment caused by transmitting the uplink control information on the PUSCHs can be effectively avoided, and meanwhile, the downlink data transmission performance can be ensured.

The embodiment of the present application also provides a schematic flowchart of an uplink control information transmission method. The method can be as follows. Base station equipment is adopted as an execution subject in the embodiment of the present application.

S1: the base station equipment schedules a first physical uplink shared channel (PUSCH) set, wherein every PUSCH contained in the first PUSCH set overlaps with a physical uplink control channel (PUCCH) in time.

S2: the base station equipment obtains uplink control information (UCI) transmitted by user equipment on a first PUSCH in the first PUSCH set.

Wherein the UCI includes hybrid automatic repeat request mechanism response information (HARQ-ACK/NACK), and the HARQ-ACK/NACK corresponds to at least one piece of downlink data received by the user equipment.

Wherein the first PUSCH belongs to a second PUSCH set, and the second PUSCH set is composed of PUSCHs, meeting the set condition, in the first PUSCH set.

The set condition described in the embodiments of the present application can be obtained in the following ways:

1. The set condition includes that: the Time Difference between the Start Time of the PUSCH and the End Time of the at least one piece of downlink data is not less than a first set threshold;

wherein the first set threshold corresponds to the minimum value of Time Differences supported by the user equipment, and the Time Difference is the time difference between the end time of a physical downlink shared channel (PDSCH) and the start time of corresponding HARQ-ACK/NACK feedback.

2. The set condition includes that: the start time of the PUSCH is not earlier than the start time of the PUCCH.

3. The set condition includes that: the end time of the PUSCH is not later than the end time of the PUCCH.

These ways can be used in combination or individually, which is not specifically limited herein.

Optionally, if the second PUSCH set includes at least two PUSCHs, the start time of the first PUSCH is the earliest among the start time of every PUSCH in the second PUSCH set and/or the index of the cell where the first PUSCH is located is the smallest among cells where every PUSCH in the second PUSCH set is located.

Based on the same inventive concept, an embodiment of the present application further provides uplink control information transmission device which includes:

a scheduling unit, configured to schedule a first physical uplink shared channel (PUSCH) set, wherein every PUSCH contained in the first PUSCH set overlaps with a physical uplink control channel (PUCCH) in time; and a processing unit, configured to obtain uplink control information (UCI) transmitted by user equipment on a first PUSCH in the first PUSCH set.

Based on the same inventive concept, an embodiment of the present application further provides uplink control information transmission device, including at least one processor and a memory storing a program, and configured to perform the following steps by the at least one processor:

scheduling a first physical uplink shared channel (PUSCH) set, wherein every PUSCH contained in the first PUSCH set overlaps with a physical uplink control channel (PUCCH) in time; and obtaining uplink control information (UCI) transmitted by user equipment on a first PUSCH in the first PUSCH set.

Those skilled in the art should understand that the embodiments of the present application can be provided as methods, devices (equipment) or computer program products. Therefore, the present application may take the form of entirely hardware embodiments, entirely software embodiments or embodiments combining software with hardware. Moreover, the present application may take the form of computer program products implemented on one or more computer available storage media (including but not limited to disk storages, CD-ROMs and optical storages) containing computer operable program codes.

The present application is described with reference to the flowcharts and/or block diagrams of methods, devices (equipment) and computer program products according to the embodiments of the present application. It should be understood that each flow and/or block in the flowcharts and/or block diagrams and a combination of the flows and/or blocks in the flowcharts and/or block diagrams can be implemented by computer program instructions. These computer program instructions can be supplied to a general-purpose computer, a special-purpose computer, an embedded processor or a processor of other programmable data processing device to produce a machine, and thus a device for implementing the functions specified in one or more flows in the flowcharts and/or one or more blocks in the block diagrams is generated by executing the instructions through a computer or a processor of other programmable data processing device.

These computer program instructions may also be stored in a computer-readable memory which can guide a computer or other programmable data processing device to operate in a specific mode, so that the instructions stored in the computer-readable memory produce a manufactured product including an instruction device, and the instruction device implements the functions specified in one or more flows in the flowcharts and/or one or more blocks in the block diagrams.

These computer program instructions can also be loaded onto a computer or other programmable data processing device, so that a series of operating steps are performed on the computer or other programmable device to achieve the computer processing effect, and the instructions executed on the computer or other programmable device thus provide steps for implementing the functions specified in one or more flows in the flowcharts and/or one or more blocks in the block diagrams.

Although the preferred embodiments of the present application have been described, those skilled in the art can make additional variations and modifications to these embodiments once they learn the basic inventive concept. Therefore, the appended claims are intended to be interpreted as including the preferred embodiments and all variations and modifications falling within the scope of the present application.

Obviously, those skilled in the art can make various modifications and variations to the present application without departing from the spirit and scope of the present application. In this way, if these modifications and variations of the present application fall within the scope of the claims of the present application and the equivalent technologies thereof, the present application is also intended to include these modifications and variations.

The invention claimed is:

1. An uplink control information transmission method, comprising:
   determining, by user equipment, a physical uplink control channel (PUCCH) corresponding to uplink control information (UCI); and
   transmitting, by the user equipment, the UCI on a first physical uplink shared channel (PUSCH) in a first PUSCH set;
   wherein every PUSCH contained in the first PUSCH set overlaps with the PUCCH in time;
   wherein the UCI contains hybrid automatic repeat request mechanism response information (HARQ-ACK/NACK), and the HARQ-ACK/NACK corresponds to at least one piece of downlink data received by the user equipment;
   wherein, the first PUSCH is one PUSCH meeting a set condition in the first PUSCH set, the set condition comprising that a Time Difference between a start time of the PUSCH and an end time of the at least one piece of downlink data is not less than a first set threshold;
   wherein the first set threshold corresponds to a minimum value of the Time Difference supported by the user equipment, and the Time Difference is the time difference between an end time of a physical downlink shared channel (PDSCH) and a start time of corresponding HARQ-ACK/NACK feedback.

2. The uplink control information transmission method according to claim 1, wherein the set condition comprises that:
   the start time of the PUSCH is not earlier than the start time of the PUCCH.

3. The uplink control information transmission method according to claim 1, wherein the set condition comprises that:
   an end time of the PUSCH is not later than an end time of the PUCCH.

4. The uplink control information transmission method according to claim 1, wherein at least two PUSCHs meet the set condition in the first PUSCH set; a start time of the first PUSCH is the earliest among a start time of every PUSCH meeting the set condition and/or an index of a cell where the first PUSCH is located is the smallest among cells where every PUSCH meeting the set condition is located.

5. The uplink control information transmission method according to claim 1, wherein the first PUSCH belongs to a second PUSCH set; the second PUSCH set is composed of PUSCHs, meeting the set condition, in a first PUSCH set.

6. The uplink control information transmission method according to claim 5, wherein under a condition that the second PUSCH set comprises at least two PUSCHs, a start time of the first PUSCH is the earliest among a start time of every PUSCH in the second PUSCH set and/or an index of a cell where the first PUSCH is located is the smallest among cells where every PUSCH in the second PUSCH set is located.

7. The uplink control information transmission method according to claim 1, used for base station equipment, comprising:
   scheduling, by the base station equipment, the first PUSCH set, wherein every PUSCH contained in the first PUSCH set overlaps with the PUCCH in time; and
   obtaining, by the base station equipment, the UCI transmitted by the user equipment on the first PUSCH in the first PUSCH set.

8. An uplink control information transmission device, comprising at least one processor and a memory storing a program, the program when executed by the at least one processor, causing the processor to perform the following steps of:
   determining a physical uplink control channel (PUCCH) corresponding to uplink control information (UCI); and
   transmitting the UCI on a first physical uplink shared channel (PUSCH) in a first PUSCH set, wherein every PUSCH contained in the first PUSCH set overlaps with the PUCCH in time;
   wherein the UCI contains hybrid automatic repeat request mechanism response information (HARQ-ACK/NACK), and the HARQ-ACK/NACK corresponds to at least one piece of downlink data received by the user equipment;
   wherein, the first PUSCH is one PUSCH meeting a set condition in the first PUSCH set, the set condition comprises that a Time Difference between a start time of the PUSCH and an end time of the at least one piece of downlink data is not less than a first set threshold;
   wherein the first set threshold corresponds to a minimum value of the Time Difference supported by the user equipment, and the Time Difference is the time difference between an end time of a physical downlink shared channel (PDSCH) and a start time of corresponding HARQ-ACK/NACK feedback.

9. The uplink control information transmission device according to claim 8, wherein the set condition comprises that:
   the start time of the PUSCH is not earlier than the start time of the PUCCH.

10. The uplink control information transmission device according to claim 8, wherein the set condition comprises that:
    an end time of the PUSCH is not later than an end time of the PUCCH.

11. The uplink control information transmission device according to claim 8, wherein at least two PUSCHs meet the set condition in the first PUSCH set; a start time of the first PUSCH is the earliest among a start time of every PUSCH meeting the set condition and/or an index of a cell where the first PUSCH is located is the smallest among cells where every PUSCH meeting the set condition is located.

12. The uplink control information transmission device according to claim 8, wherein the first PUSCH belongs to a second PUSCH set; the second PUSCH set is composed of PUSCHs, meeting the set condition, in a first PUSCH set.

13. The uplink control information transmission device according to claim 12, wherein under a condition that the second PUSCH set comprises at least two PUSCHs, a start time of the first PUSCH is the earliest among a start time of every PUSCH in the second PUSCH set and/or a index of a cell where the first PUSCH is located is the smallest among cells where every PUSCH in the second PUSCH set is located.

14. An uplink control information transmission device, comprising at least one processor and a memory storing a program, the program when executed by the at least one processor, causing the processor to perform the following steps of:
    scheduling a first physical uplink shared channel (PUSCH) set, wherein every PUSCH contained in the first PUSCH set overlaps with a physical uplink control channel (PUCCH) in time; and obtaining uplink control information (UCI) transmitted by user equipment on a first PUSCH in the first PUSCH set;

wherein the UCI contains hybrid automatic repeat request mechanism response information (HARQ-ACK/NACK), and the HARQ-ACK/NACK corresponds to at least one piece of downlink data received by the user equipment;

wherein, the first PUSCH is one PUSCH meeting a set condition in the first PUSCH set, the set condition comprising that a Time Difference between a start time of the PUSCH and an end time of the at least one piece of downlink data is not less than a first set threshold;

wherein the first set threshold corresponds to a minimum value of the Time Difference supported by the user equipment, and the Time Difference is the time difference between an end time of a physical downlink shared channel (PDSCH) and a start time of corresponding HARQ-ACK/NACK feedback.

15. An uplink control information transmission device, for the method according to claim 1, comprising at least one processor and a memory storing a program, and configured to perform the following steps by the at least one processor:
  determining the PUCCH corresponding to the UCI; and
  transmitting the UCI on the first PUSCH in the first PUSCH set;
  wherein every PUSCH contained in the first PUSCH set overlaps with the PUCCH in time.

16. An uplink control information transmission device, for the method according to claim 1, comprising at least one processor and a memory storing a program, and configured to perform the following steps by the at least one processor:
  scheduling the first PUSCH set, wherein every PUSCH contained in the first PUSCH set overlaps with a physical uplink control channel (PUCCH) in time; and
  obtaining the UCI transmitted by user equipment on the first PUSCH in the first PUSCH set.

* * * * *